United States Patent [19]
Kuhnert

[11] 3,803,680
[45] Apr. 16, 1974

[54] MACHINING CENTER WITH A STORAGE DRUM ROTATABLE ABOUT A HORIZONTAL AXIS

[75] Inventor: Hans Kuhnert, Wiesloch, Germany

[73] Assignee: Heidelberger Druckmaschinen AG, Heidelberg, Germany

[22] Filed: Aug. 5, 1971

[21] Appl. No.: 169,271

[30] Foreign Application Priority Data
Aug. 5, 1970 Germany............................ 2038842

[52] U.S. Cl............................. 29/36, 29/40, 29/41, 29/42, 408/23, 408/35
[51] Int. Cl............................................. B23b 39/20
[58] Field of Search.............. 408/35, 23; 29/39, 40, 29/41, 42, 36

[56] References Cited
UNITED STATES PATENTS

| | | |
|---|---|---|
| 2,956,454 | 10/1960 | Hansen................................. 408/35 |
| 3,691,899 | 9/1972 | Antonietto et al..................... 408/35 |
| 2,442,635 | 6/1948 | Bennett.................................... 29/42 |

*Primary Examiner*—Gil Weidenfeld
*Attorney, Agent, or Firm*—Herbert L. Lerner

[57] ABSTRACT

Machining center includes a cross-feed table, at least one storage drum mounted on the cross-feed table, the storage drum being rotatable about a horizontal axis and displaceable in direction of the axis, a plurality of spindle sleeves mounted in the storage drum at mutually spaced locations along at least one circle symmetrical to the periphery of the storage drum and parallel to the axis, and at least one machining tool received in each of the spindle sleeves, the storage drum being turnable about the horizontal axis to positions at which the tools are respectively at a given elevation so as to be in operating position for machining a workpiece.

15 Claims, 13 Drawing Figures

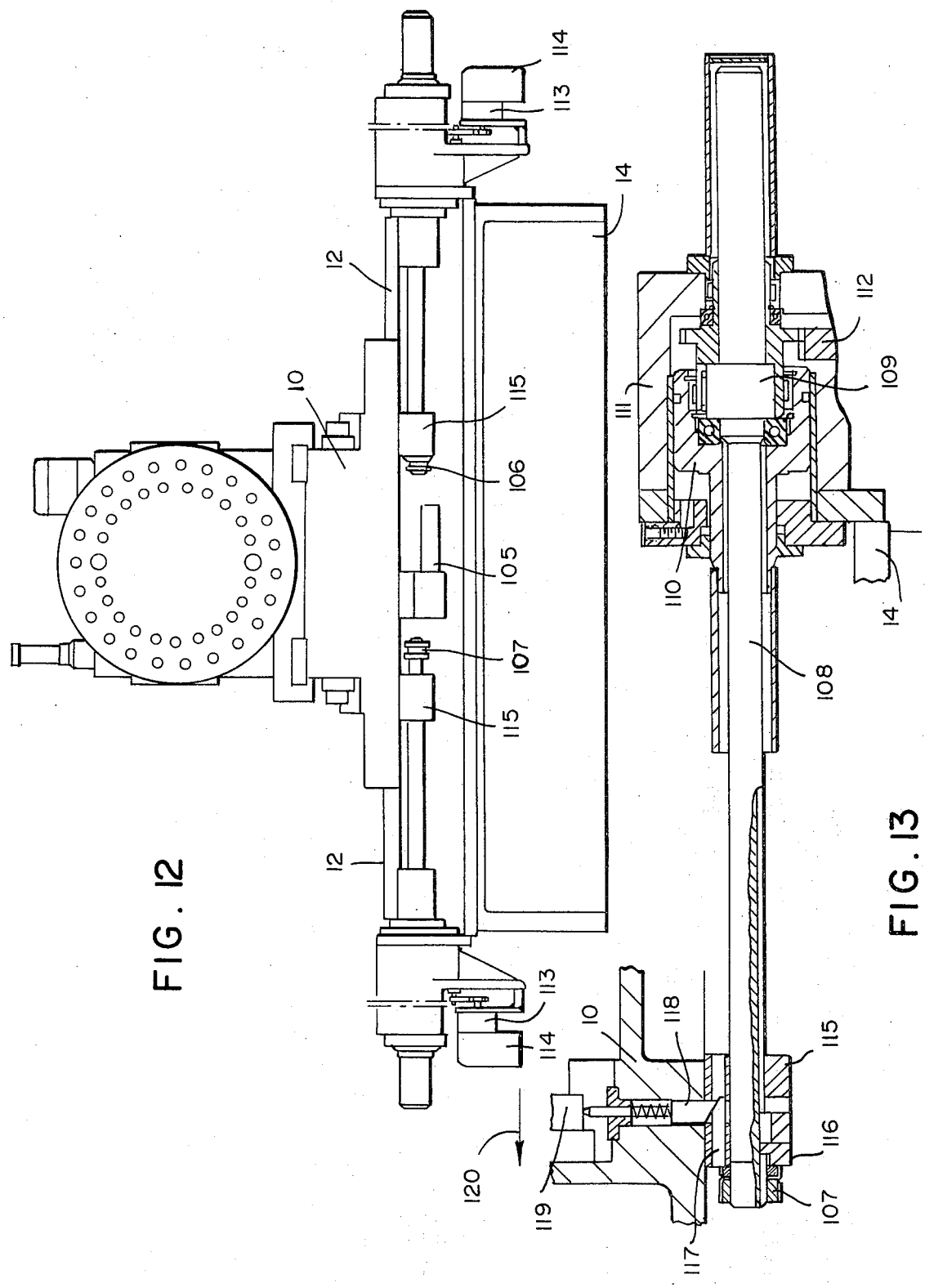

MACHINING CENTER WITH A STORAGE DRUM ROTATABLE ABOUT A HORIZONTAL AXIS

The invention relates to a machining center having a storage drum rotatable or turnable about a horizontal axis, a plurality of spindle sleeves being mounted in the storage drum along at least one circle symmetrical to the periphery of the storage drum and parallel to the horizontal axis thereof, the storage drum being turnable about the horizontal axis thereof for advancing the respective spindle sleeves into operating position thereof.

A machining center has been known heretofore wherein the tool storage is in the form of a stationary storage drum which is rotatable about a horizontal axis. This known storage drum carries a number of spindle sleeves distributed symmetrically along a circle, each of the spindle sleeves being studded with a tool coordinated therewith. The spindle sleeves are axially displaceably and interchangeably mounted in the storage drum. By turning the storage drum, the tool selected for a machining operation can be brought into the operating position thereof. It is then in the lowermost position that it can assume in the storage drum. In that position, the spindle sleeve appertaining to the tool that has been made ready, is coupled through an electromagnetic gear coupling to the drive of the machining center and can be placed in rotation as well as advanced linearly.

Due to the fixed location of the operating position, the workpiece table is movable in direction of the longitudinal and transverse axes thereof in order to be capable of adjusting the workpiece relative to the tool that has been made ready. The machining operation is effected by axially displacing the coupled spindle sleeve within the storage drum bearing thereof.

A special advantage of the aforedescribed heretofore known machining center is that the tool storage advances the tools directly into the operation or machining position. The intervention of a tool changer is thereby superfluous. It is furthermore advantageous that a separate spindle is coordinated with each tool. Thereby, the spindle bearing in the spindle sleeve is able to be accommodated to the special tool and the type of machining associated therewith.

The aforementioned heretofore known device has disadvantages, however. Thus, for example because of the stationary storage drum a relatively large travel of the spindle sleeve is required which weakens the stability of the tools. Also, the disposal within the workpiece table of the displacement shafts for the longitudinal and transverse adjustments is disadvantageous, because it obstructs the use of automatic loading devices as well as the connection of the heretofore known machining centers with similar units (Wyssbrod — Machining Center MC 20 S).

It is accordingly an object of the invention to improve the adjustment and control of a machining center having a storage drum that is turnable about a horizontal axis which achieves rapid positioning of the tool, dispenses with longitudinal and transverse adjustment of the workpiece table and avoids spindle sleeve travel which tends to impair the stability of the tool.

With the foregoing and other objects in view, I provide, in accordance with the invention, a machining center having on a cross-feed table one or more storage drums rotatable about horizontal axes and displaceable in axial feed direction, the spindle sleeves thereof being distributed along one or more circles and carrying respectively a single or group tool, each of the individual or group tools adjustable to an elevation in which they are advanced into machining or operating position by turning the storage drums about the respective horizontal axes. The term group tool means, for example, a multi-spindle head.

The cross-feed table adjusts or moves the storage drum or the storage drums in longitudinal direction and in direction toward the clamped or chucked workpiece. By means of the turning of the storage drum, the respective tool which is being made ready can be adjusted to the given machining or operating level or elevation. Accordingly, all thee displacement shafts are located in the cross-feed table and the storage drums mounted thereon. A separate device for transverse adjustment of the tool is therefore superfluous.

A particular advantage of a device constructed in accordance with the invention is that the machining or operating position is not a fixed location. On the contrary, the spindle sleeves are employed for the purpose of the machining operation at each point of the circle along which they are disposed, which markedly increases the working range of the machining center of the invention with respect to the longitudinal axis thereof. Furthermore, for expanding the tool supply, two storage drums are capable of being mounted adjacent one another across the cross-feed table. It is furthermore also advantageous that the entire storage drum carries out the operating travel. The stability of the machining or operating tool is thereby assured.

In accordance with another feature of the invention, I provide a machining center which includes means for axially displacing a respective tool, located in operating position thereof, a constant distance relative to the other tools stored in the storage drum, prior to performing a machining operation with the respective tool, and for returning the respective tool to the original axial position thereof after completion of the machining operation.

This constant distance or feed permits the use of storage drums with relatively large diameters which can consequently accommodate many spindle sleeves because the adjacent tools, due to the advanced location of the tools that are in the machining or operating position are not disturbed during the machining operation. The extent of the constant feed remains thereby within such limits that the necessary stability of the machining tool is always assured.

In accordance with a further feature of the invention, there is provided a machining center which includes means for coupling the spindle of a respective tool to a machine tool drive after the respective tool has been axially displaced the constant distance or completed the feed thereof. Assurance is given thereby that only the tool which has been advanced into the machining or operating position will be the one that will always rotate. Rotation of the advanced tool is inapplicable if, as in another embodiment of the invention of the instant application, one or more spindle sleeves of a storage drum is provided with non-rotatable tools for performing a turning operation on a rotating workpiece. Such tools are in fact advanced the constant distance as for any machining operation that is to be performed but are, however, not placed in rotation.

In accordance with yet another feature of the invention, there is provided a machining center wherein the cross-feed table is movable for displacing the storage drum in direction of the horizontal axis thereof, and includes stop means for limiting the movement of the cross-feed table and the turning movement of the storage drum, and numeric control means for adjusting the stop means. The use of such stop means in the device of the invention in the instant application, as compared with heretofore known devices of the same type, calls for considerable shorter periods of operation because the travel displacements both of the cross-feed table as well as of the storage drum can be carried out simultaneously and at great speed. The extent of the positioning speed can be increased if the stop means or the parts of the cross-feed table and of the storage drums which strike the stop means are shock absorbing, There is no necessity for the use of any time to adjust the stop means if, in accordance with an additional feature of the invention, two sets of stops are coordinated with each direction of displacement of the cross-feed table and each direction of turning of the storage drum, only one of each of the sets of stops being actuable for adjusting the respective workpiece into the operating position thereof, while the other of each of the sets is kept free for adjustment through the numeric control means to values coordinated with a next successive workpiece that is to be placed in machining or operating position.

Other features which are considered as characteristic for the invention are set forth in the appended claims.

Although the invention is illustrated and described herein as embodied in machining center with a storage drum rotatable about a horizontal axis, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

FIG. 12 is a front elevational view of a machining center according to the invention having only one storage drum as well as an adjusting device for stops limiting longitudinal displacement of the storage drum; and FIG. 13 is an enlarged fragmentary view, partly in section of the adjusting drive for a stop of the machining center as shown at the right-hand side of FIG. 12.

Figure 1:
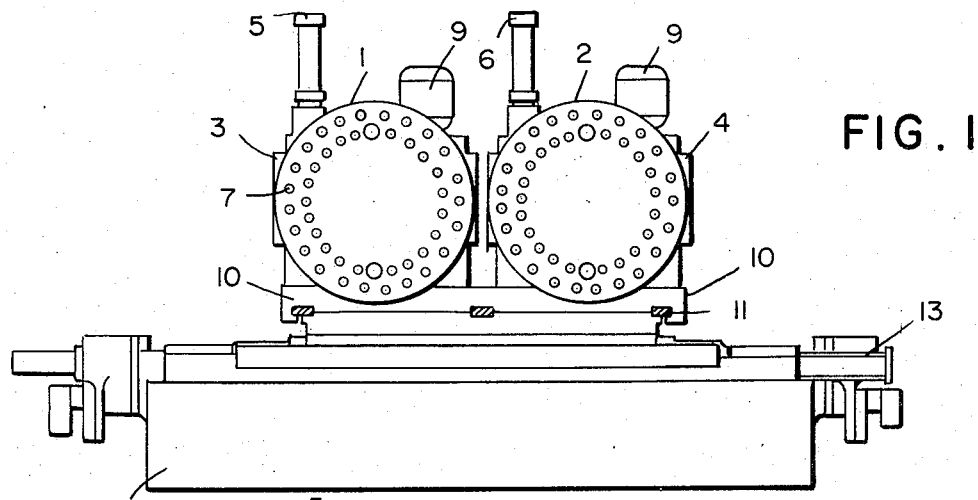
FIG. 1 is a front elevational view of a machining center with two storage drums constructed in accordance with the invention.
Figure 2:
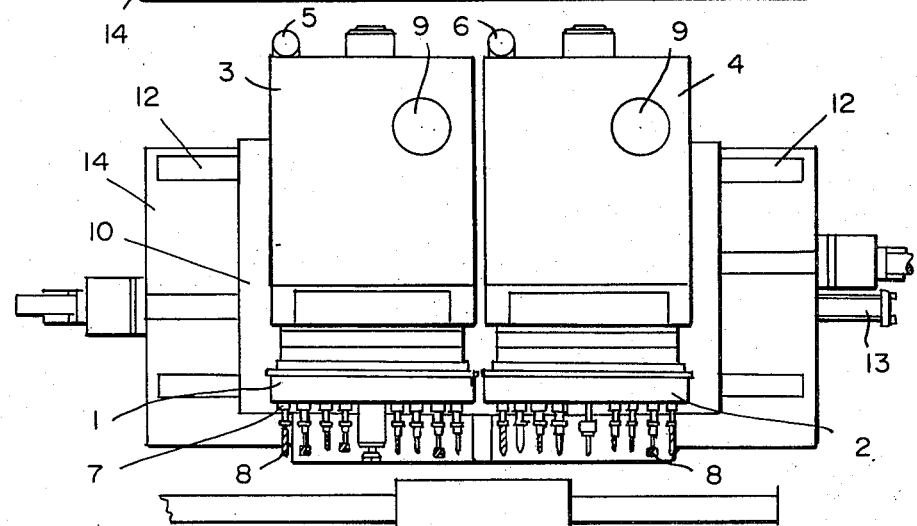
FIG. 2 is a top plan view of FIG. 1.
Figure 3:
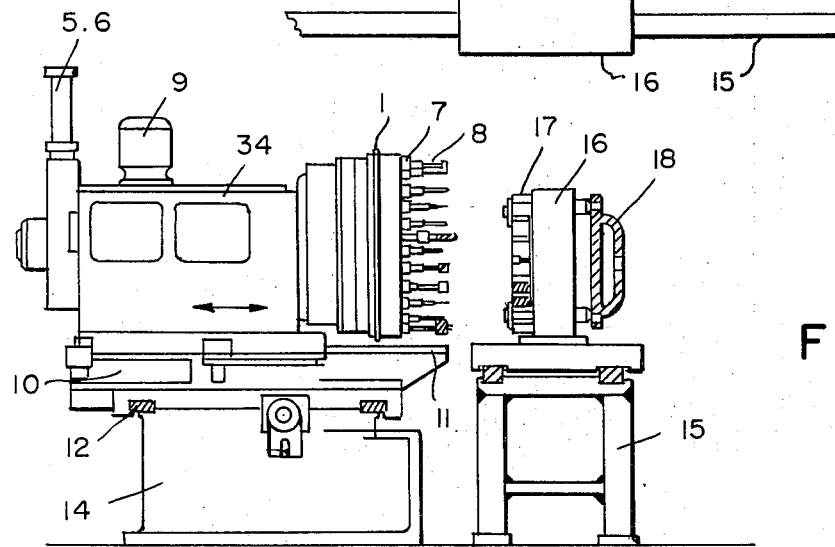
FIG. 3 is a side elevational view of FIGS. 1 and 2.

Referring now to the drawings and first, particularly to FIGS. 1 to 3 thereof, there is shown a machining center having two storage drums 1 and 2 which are mounted in a respective spindle-stock 3 and 4 and are rotatable about respective horizontal and mutually parallel axes. An hydraulic drive mechanism is provided respectively for rotating each of the storage drums 1 and 2, the cylinders 5 and 6 of the hydraulic drive mechanisms being located at the rear of the respective spindle-stocks 3 and 4.

The storage drums 1 and 2 are studded with spindle sleeves 7 for receiving individual and group tools 8. The spindle sleeves 7 are disposed in two separate circles in each storage drum 1, 2 and are spaced at regular distances from one another. The individual or group tools, which are rotatable, are driven by a respective motor 9 secured on each of the spindle-stocks 3 and 4 when the tools have been brought into operating position. The spindle-stocks 3 and 4 are disposed directly adjacent one another on a cross-feed table 10 which can be displaced over the guideway 11 for advancing the storage drums 1 and 2 in horizontal direction toward the workpiece that is to be machined and can be laterally displaced over the guideway 12 relative to the workpiece. The lateral displacement of the cross-feed table 10. hereinafter referred to as the longitudinal displacement thereof, is effected through an hydraulic drive 13. A non-illustrated electric drive produces the displacement of the storage drums 1 and 2 in direction toward the workpiece as well as the feed displacement of the respectively made-ready tools 8. The just-mentioned electric drive slides forwardly and backwardly the upper part of the cross-feed table 10 carrying the spindle-stocks 3 and 4.

The cross-feed table 10 is carried by a machine base 14 at which the aforementioned hydraulic drive 13 is secured. A workpiece transport track 15 extends past the front of the machining center and, as shown in FIG. 3, a clamping or chucking table 16 is located on the track 15 at the machining station and is provided with two workpieces 17 and 18, which can be selectively brought into machining position by turning the clamping table 16 through an angle of 180° at a location beyond the machining station.

Positioning of a tool 8 of either storage drum 1 or 2 is effected in the following manner:

After selecting a machining program appertaining to the workpiece 17, for example by means of a coding applied to the workpiece or the holder therefor, the first tool 8 of the storage drums 1 and 2 to be placed in operation, is driven forward a given constant distance, such as 100 mm, for example, relative to all of the other stored tools whose points, without exception, are disposed substantially in a common vertical plane. Simultaneously, a longitudinal and forward displacement of the cross-feed table 10 at fast travel as well as a rotation of that storage drum 1 which carries the selected tool 8, are instituted. These displacements end as soon as the selected tool 8 has assumed the predetermined lateral and elevational position thereof.

Solely by turning the storage drum 1 or 2, the selected tool 8 can thus be advanced to the operating position thereof and simultaneously adjusted at the predetermined elevation or level. Since the operating position can be located at a desired point of the separate circles on which the spindle sleeves 7 are disposed, for the same longitudinal feed of the cross-feed table 10, the operating range turns out to be greater than if only a specific location of a spindle sleeve 7, for example, the lowest in the separate circle of the spindle sleeves 7, can be the operating position of the tool. The possibility of adjusting the elevation of the tool to be placed in operation by means of the storage drum 1 or 2 thereby not only dispenses with a separate elevational adjustment of the machine but has the effect, moreover, of increasing the operating range.

The operating feed of the aforedescribed machining center in horizontal direction, i.e., transversely to the workpiece, must be at least equal to the largest of the separate circles in which the spindle sleeves 7 are located in the storage drum, when the machine is provided with one storage drum. With a machine having two storage drums, the feed must be equal to the center spacing between both drums. Only thereby is it possible for all of the available tools to be able to be placed in operation in the entire operating range of the machining center.

Figure 4:
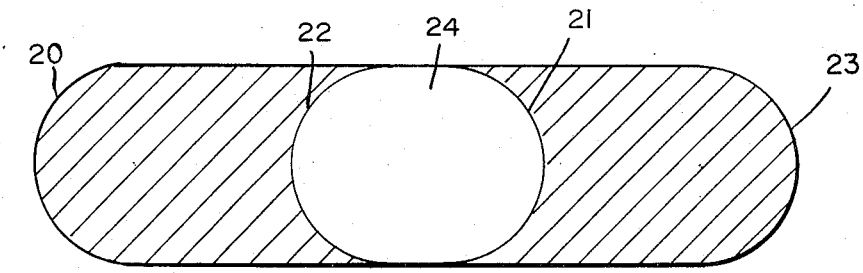
FIG. 4 is a schematic representation of the working range of the machining center of FIGS. 1 to 3.

FIG. 4 shows schematically the operating range of the machining center of FIGS. 1 to 3. The storage drum 1 is capable of placing the tools 8 stored therein, in operation between the left-hand side outer circular arc 20 and the right-hand side inner circular arc 21. The other storage drum 2 can place the tools 8 stored therein in operation from the left-hand side inner circular arc 22 to the right-hand side outer circular arc 23. The tools 8 of both storage drums 1 and 2 are thereby capable of being placed in operation only in the central unshaded area 24 of FIG. 4, while only the tools 8 of the storage drum 1 cover the shaded area at the left-hand side of FIG. 4 and only the tools of the storage drum 2 cover the shaded area at the right-hand side of FIG. 4.

Figure 5:
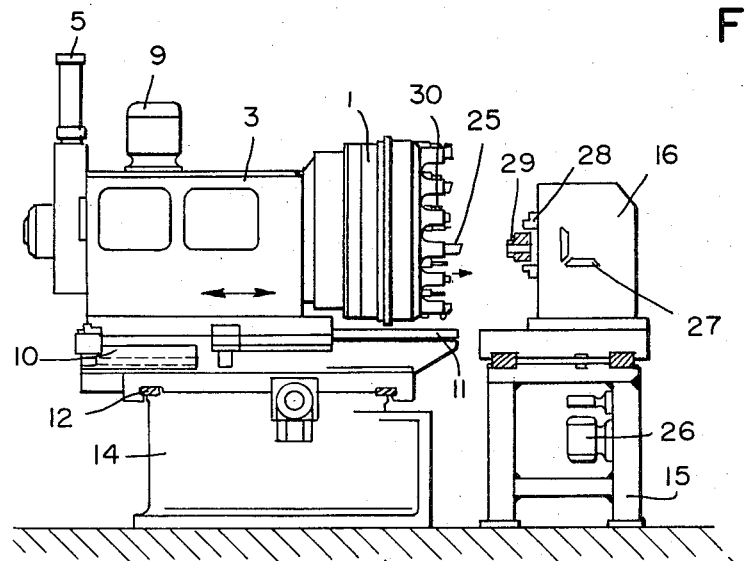
FIG. 5 is a view corresponding to that of FIG. 3 of a modified form of the machining center having a rotary drive for machining rotationally symmetrical workpieces.

A modification of the machining center embodiment of FIGS. 1 to 3 is shown in FIG. 5 wherein several spindle sleeves 7 of the storage drums 1 and 2 are provided with non-rotatable tools 25 for performing turning operations on a rotationally symmetrical workpiece. At the elevation of the operating position in this embodiment of the machining center shown in FIG. 5, a rotary drive 26 is mounted in the workpiece transport track 15 and drives a chuck 28 which has a rotary axis coinciding with the longitudinal axis of the tool 25, by means of a bevel gearing 27 provided in the clamping table 16. A rotationally symmetrical workpiece 29, which, in the case at hand, is to be subjected to both a turning as well as a boring operation, is held by the chuck 28.

For the purpose of performing a turning operation thereon, the workpiece 29 is now set into rotation by means of the drive 26. The selected, non-rotatable turning tool 25 is advanced at a constant rate. Simultaneously, the positioning of the selected turning tool 25 is instituted in the above-indicated manner. It results thus likewise by turning the respective storage drum 1 or 2 as well as by means of a longitudinal travel displacement of the cross-feed table 10. The cross-feed table 10, which carries the storage drums 1 and 2, attends to the advancement of the non-rotatable turning tool 25 as well as the feed displacement thereof, as mentioned hereinabove. If a boring operation is to be carried out instead of the turning operation, a boring tool 30 must be brought into operating position instead of the turning tool 25, and the rotary drive 26 must be rendered inoperative. Instead of the workpiece 29, the workpiece 30 advanced at a constant rate is now set into rotation since it is coupled to the drive motor 9 at the end of the feed displacement.

Figure 6:
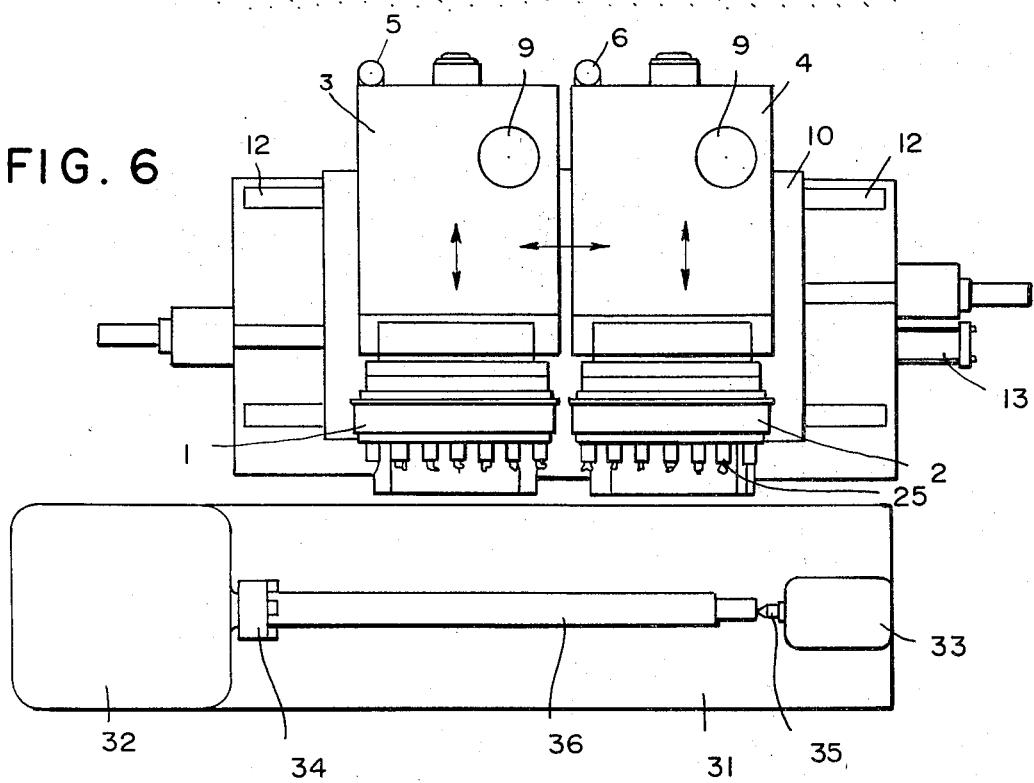
FIG. 6 is a view corresponding to that of FIG. 2 of another modified form of the machining center for turning elongated workpieces.

In addition to machining rotationally symmetrical workpieces such as casing or rod parts, the machining center of FIGS. 1 to 3 are also suited for turning elongated shafts, for example, as shown in FIG. 6. At least several spindle sleeves 7 of the storage drums 1 and 2 must then be studded, exactly as for the turning operation performed on rotationally symmetrical workpieces in accordance with FIG. 5, with non-rotational turning tools 25. With the storage drums 1 and 2, there is located, in this case, at the location of the workpiece transport track 15, a rotary bed 31 with a spindle stock 32 and a displaceable tailstock 33. The chuck 34 of the spindle stock 32 and the tailstock point 35 carry together a shaft 36 which is to be turned. A rotary drive provided on the spindle stock 32, but not illustrated, however, in FIG. 6, sets the shaft 36 in rotation by rotating the chuck 34. The positioning of the turning tool 25 is effected by advancing the tool 25 relative to the remaining tools of the storage drums 1 and 2 at a constant rate, and furthermore through the displacement of the cross-feed table 10 as well as through the turning movement of the respective storage drum 1 or 2. The feed displacement of the turning tool 25 is effected by the drive 13 of the cross-feed table 10 which is provided for the longitudinal displacement of the storage drums.

Figure 7:
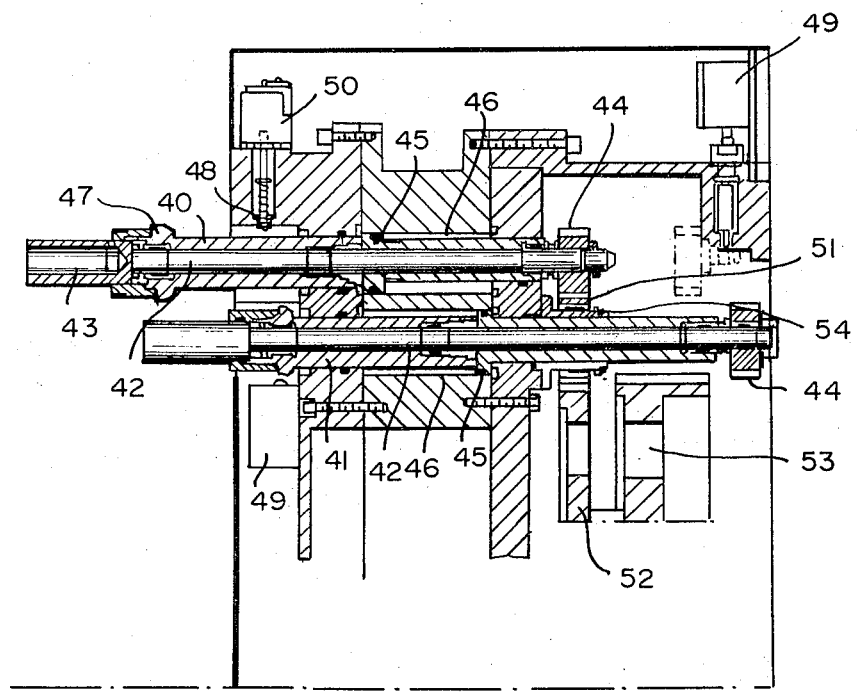
FIG. 7 is an enlarged cross-sectional view of a storage drum of the machining center with spindle sleeves for boring tools.

The spindle sleeves as well as the spindles mounted therein can be markedly accommodated to the technological demands of the tools received therein. For example, FIG. 7 shows how the spindle sleeves and spindles for receiving boring tools can be constructed and mounted. As can be seen in FIG. 7, two groups of spindle sleeves 40 and 41 are disposed in two circles of different diameters when viewed from the left-hand side of FIG. 7. The spindle sleeves 40 and 41 serve, without exception, as mentioned already hereinbefore, for receiving boring tools. In the upper spindle sleeve 40, as viewed in FIG. 7, a spindle 42 is mounted on three bearings. The forward end of the spindle 42 terminates in a tool receptacle 43. The rear free end of the spindle 42 carries a driving pinion 44. The spindle sleeve 40 is provided at about the middle thereof with a piston 45 which slides in a pressure cylinder 46. The piston 46 is able to be subjected on both sides thereof to oil-hydraulic pressure.

At the forward end of the spindle sleeve 40, a collar 47 is provided behind which a spring-biased pin 48 rests, which is capable of being withdrawn by an electro-magnet 50 so that the collar 47 is freed. The rear free end of the spindle 42 actuates, as shown in phantom in FIG. 7, a terminal switch 49 which signals the control center that the spindle stock 40 has travelled into the neutral or rest position thereof.

In the advanced operating position of the spindle stock, the driving pinion 44 meshes with an intermediate pinion 51 which is in turn meshingly engaged and driven by a forward drive gear 52. An additional rear gear 53, which is keyed on the same shaft as the drive gear 52, serves for driving the driving pinion 44 of the spindle 42 of the lower spindle sleeve 41, as shown in FIG. 7. Also, the lower spindle sleeve 41 can be reciprocated over a predetermined length by a piston 45 which slides in a pressure cylinder 46. The collar 47 at the forward end of the lower spindle sleeve 41 actuates a terminal switch 49 in the withdrawn neutral or rest position thereof. The spring-loaded pin 48 and the electro-magnet 50 for the lower spindle sleeve 41 are not located in the cross-sectional plane of the drawing of FIG. 7 and are therefore not shown in the latter figure.

The aforementioned intermediate pinion 51 is mounted on a bushing 54 through which the lower spindle sleeve 41 extends, as shown in FIG. 7.

If a specific boring tool carried by the spindle sleeve 40 or 41 is called upon for performing a machining operation, the selected spindle sleeve can be advanced only if all the terminal switches 49 signal that all of the spindle sleeves 40 and 41 are located in the rear neutral or rest position and are thereby not being driven. The displacement of the selected spindle sleeve 40 or 41 occurs when the electro-magnetic coil 50 pulls the pin 48 upwardly so that the collar 47 is freed, while, simultaneously, the rear of the pistons 45 of all of the spindle sleeves 40 and 41 is subjected to pressure by pressure oil. However, only the spindle sleeve freed by the pin 48 thereof, for example the spindle sleeve 40 in FIG. 7, can advance. Then, the drive pinion 44 meshes with the intermediate pinion 51 whereby the spindle 42 and, accordingly, the tool carried by the tool receptacle 43 are driven.

The oil pressure acting upon the rear of the piston 45 is greater than the back pressure arising from the machining operation. When the operation is completed, the oil pressure changes from the rear to the front surface of the piston 45. The result is that the piston 45 is forced against the rear limit of the pressure cylinder 46. The spindle sleeve 40 thereby returns to the neutral or rest position thereof. The terminal switch is actuated by the end of the spindle 42 and signals the completion of the retraction of the spindle sleeve 40. The drive of the tool previously placed in operation is also interrupted by the displacement of the drive pinion 44 into the phantom position thereof in FIG. 7. After the terminal switch 49 has been actuated, another selected tool carried by one or another spindle sleeve 40, 41 can be driven out into the operating position thereof.

As mentioned hereinabove, the mounting and construction of the spindle sleeves are able to be accommodated to the type of tool that is to be received. Thus, FIG. 8 shows, for example, how a spindle sleeve or spindle, which is suited especially for receiving milling tools, can be disposed and mounted in the storage drum.

Figure 8:
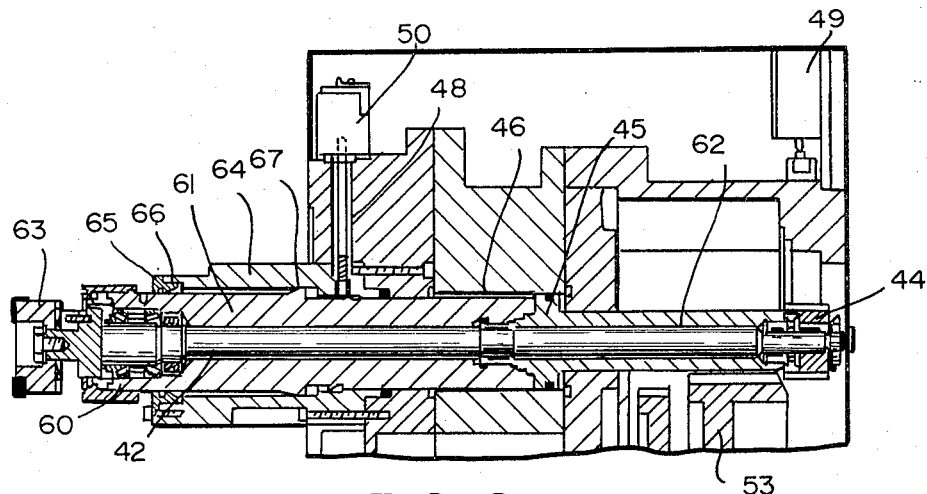
FIG. 8 is an enlarged cross-sectional view of a storage drum according to the invention with a spindle sleeve for milling tools or for center boring.

The spindle sleeve shown in FIG. 8 is formed of a very sturdy forward tube 61 and a more weakly constructed rear tube 62. Both tubes 61 and 62 are rigidly connected to one another. The piston 45 which slides in the pressure cylinder 46 and which is subjected to pressure on both sides thereof, is located at the point of connection of the tubes 61 and 62. The collar 47 is located somewhat in the center of the forward tube 61, and the spring-loaded pin rests behind the collar 47 because the spindle sleeve 60 is located in the withdrawn neutral or rest position thereof. An electromagnet 50 can draw the pin 48 upwardly into the inactive position thereof.

The forward end of the spindle 42 carries a cutter head 63 and is moreover mounted in the forward tube 61 on a plurality of bearings. At the end face of the storage drum 1 or 2, a supporting sleeve 64 is secured coaxially to the spindle sleeve 60 and is closed by a cover 65 having an inner cone 66. A conical bead of the forward tube 61 abuts this inner cone 66 for the purpose of transmitting force, as soon as the spindle sleeve 60 has assumed the machining position thereof.

At the rear end of the spindle 42, the drive pinion 44 is again located and can be brought into meshing engagement with the rear drive gear 53 by axial displacement of the spindle sleeve 60. The terminal switch 49 is actuated by the rear end of a spindle 42 in the same manner as for the spindle sleeve 40 of FIG. 7. This sturdy construction and mounting of the spindle sleeve is not only suitable for receiving milling tools but also boring tools which are to be employed for accurate center boring.

Figure 9:
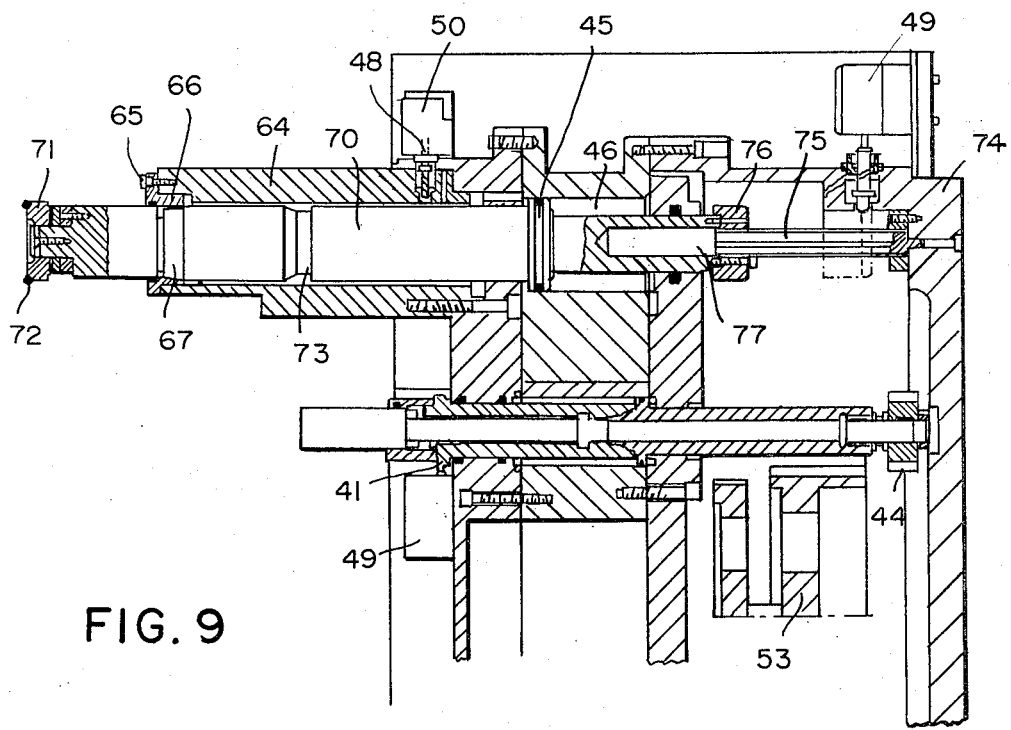
FIG. 9 is an enlarged cross-sectional view of a storage drum of the invention with a spindle sleeve for non-rotatable turning tools.

As mentioned hereinabove with respect to the description and FIGS. 5 and 6 of the drawings, non-rotatable turning tools can also be displaced in the storage drums. FIG. 9 shows an exemplary disposition and construction of a spindle sleeve 70 for turning tools in a storage drum. The spindle sleeve 70 is of non-uniform sturdiness or thickness as compared to the uniform sturdiness of the spindle sleeves 40 and 41 for boring tools, for example, because a relatively large moment of torque is produced at the turning tool. A most important feature of the sleeve 70 is that no spindle 42 is mounted therein. The forward free end of the sleeve 70 carries a tool insert 71 on which four turning cutting tools 72 are displaced, respectively offset, through an angle of 90° from one another, which can be brought into cutting engagement with a work piece specifically through the rotary movement of the respective storage drum.

At the end face of the storage drum 1 or 2, as in the embodiment of FIG. 8, a very sturdy support sleeve 64 is secured, through which the spindle sleeve 70 extends coaxially. The free end of the support sleeve 64 is closed by a cover 65, against the inner cone 66 of which a conical surface 67 formed on the spindle sleeve 70 is in force-locking engagement. The torque produced during the turning operation is virtually completely transmitted to the support sleeve 64 through the conical surfaces 66 and 67.

The spindle sleeve 70 is formed with a shoulder 73 behind which the spring-loaded pin 48, which is liftable by the electromagnet 50, is at rest when the turning tool is located in its neutral or rest position. To slide the turning tool in and out, similarly as for the aforedescribed embodiments, there is provided a piston 45 which may be subjected on both sides thereof to oil-hydraulic pressure so as to slide accordingly in the pressure cylinder 46. A splined shaft 75 secured to the rear wall 74 of the storage drum 1 or 2 projects through a guide bushing 76 provided at the end of the spindle sleeve and into a bore 77. In cooperation with the guide bushing 76, the splined shaft 75 prevents twisting of the spindle sleeve 70 as it travels back and forth. On the other hand, the splined shaft 75 does not have to absorb the moment produced by the turning cutting tools 72 because this turning moment or torque, as mentioned hereinabove, is absorbed by the support sleeve 64. In the withdrawn neutral or rest position of the spindle sleeve 70, the guide bushing 74, which is then located in the phantom position represented by the dot-dash lines in FIG. 9, actuates the terminal switch 49. The additional spindle sleeve shown in FIG. 9 corresponds in construction and disposition to the spindle sleeve 41 of FIG. 7 and is therefore believed to require no further description or explanation.

Figure 10:
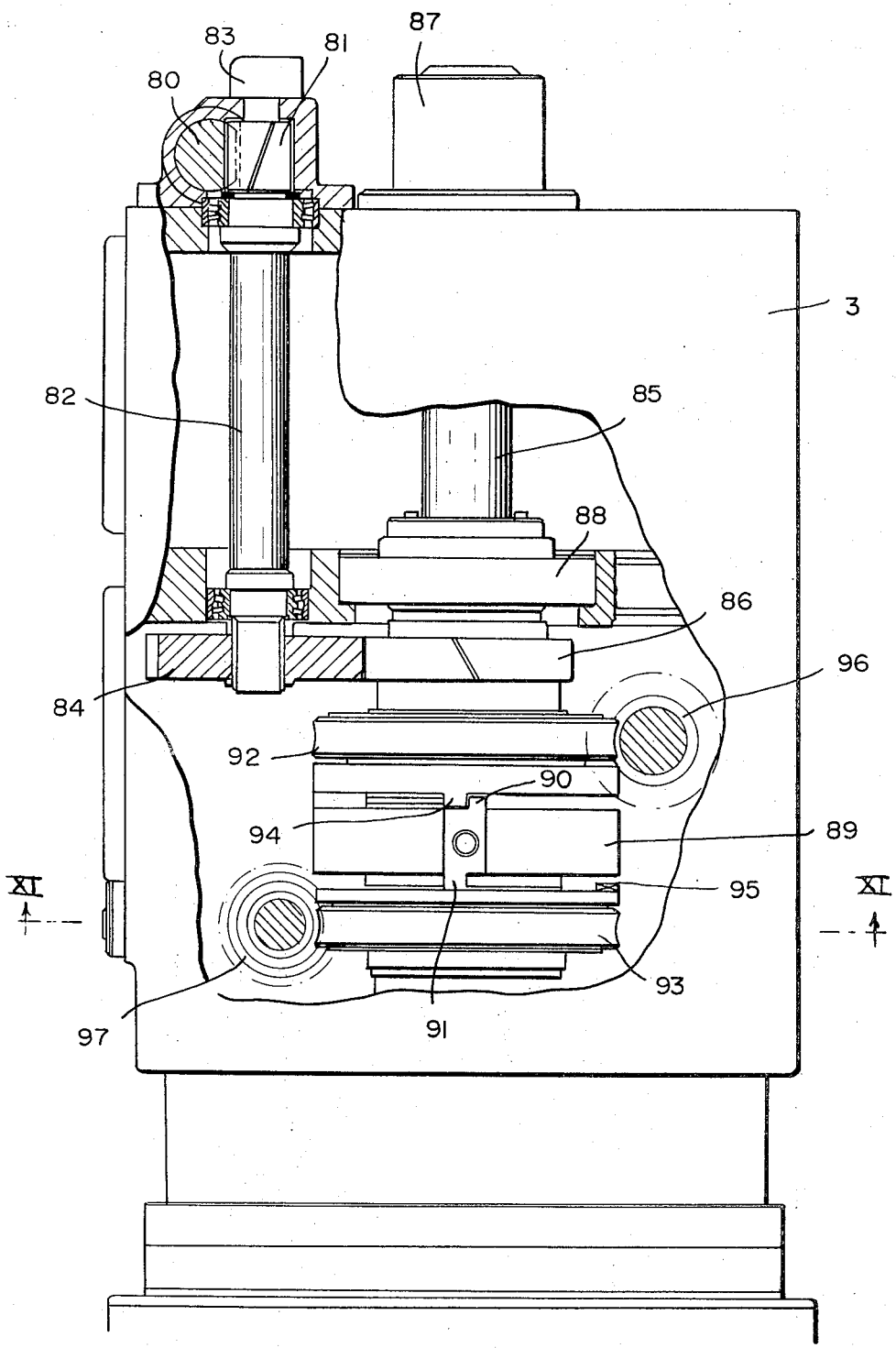
FIG. 10 is an enlarged fragmentary view of FIG. 2 partly broken away and partly in horizontal section of the drive and control of a storage drum.

In a machining center according to FIGS. 1 to 3, hydraulic driving devices set the storage drums 1 and 2 into rotation, a piston being subjected to oil-hydraulic pressure in the cylinders 5 and 6. As shown in FIG. 10, a toothed rack 80 is connected with this piston, and the linear displacement of the rack 80 is transformed into a rotary movement by a pinion 81. It is moreover assumed with respect to FIG. 1 that the drive and the control of the storage drum 1 is disclosed therein. The pinion 81 is seated on a drive shaft 82 and, in fact, at the shaft end that is coupled to a diagrammatically illustrated measuring system 83 for controlling the linear displacement of the toothed rack 80. A gear 84 is keyed to the other end of the drive shaft 82 which is mounted in double bearings, the gear 84 being in meshing engagement with a gear 86 secured on the shaft 85 of the storage drum 1. The shaft 85 is mounted in triple bearings. In FIG. 10, the end bearings 87, which is seated on the rear wall of the spindle stock 3, as well as the center bearing of the shaft 85, are visible. An abutment or stop disk 89 is secured on the shaft 85 between the center bearing 88 and the non-illustrated forward bearing of the storage drum 1, two opposing detent nose portions 90 and 91 being carried on the periphery of the stop disk 89, each of the detent nose portions 90 and 91 projecting in axial direction over a lateral surface of the stop disk 89. At both sides of the stop disk 89, a respective worm gear 92, 93 is freely rotatably mounted on the shaft 85. The worm gear 92 is provided with a stop 94 which projects into the path of travel of the detent nose portion 90, and the worm gear 93 carries a corresponding stop 95 which projects into the respective circular travel path of the detent nose portion 91. Both of the worm gears 92 and 93 are in meshing engagement respectively with a worm or screw 96, 97.

Figure 11:
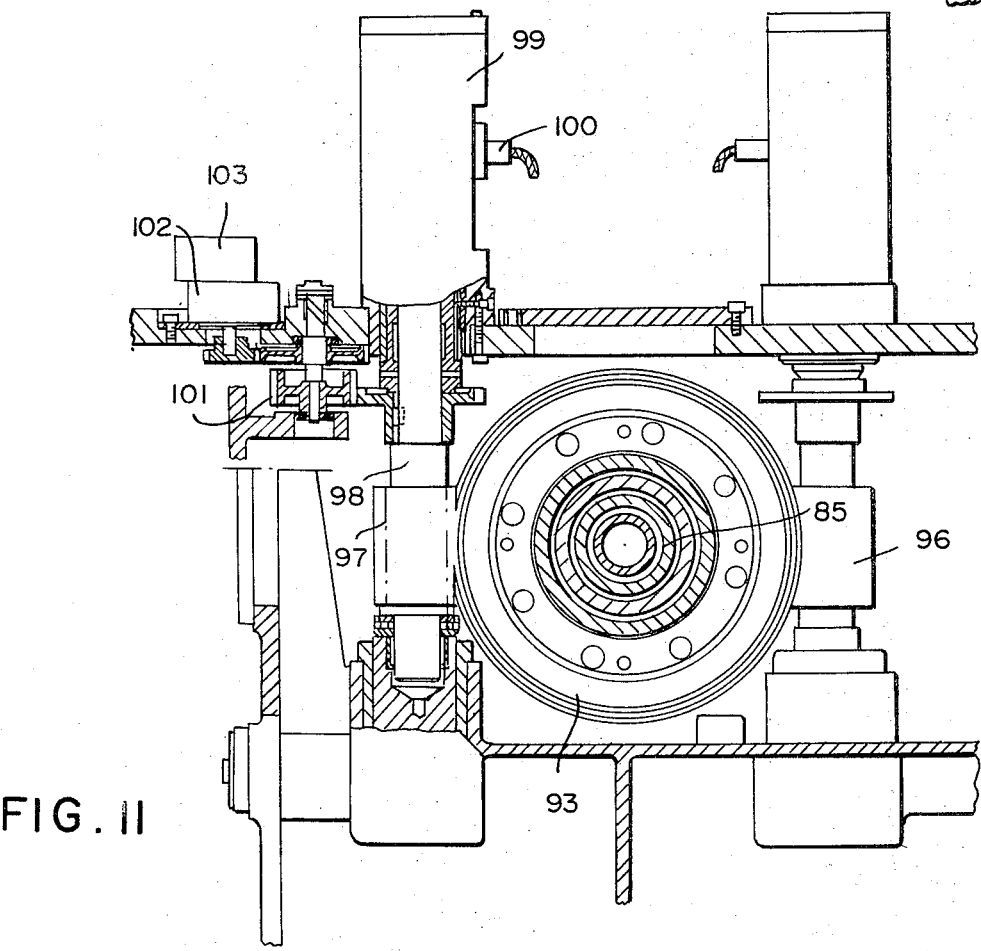
FIG. 11 is a vertical sectional view of FIG. 10 taken along the line XI—XI in the direction of the arrows.

FIG. 11 shows the adjustment drive of the worm gear 93. The drive for the other worm gear 92 is of analogous construction and is therefore believed to require no special description. A worm or screw 97 which meshes with the worm gear 93 is firmly splined on a shaft 98 which is mounted so as to be axially displaceable. One end of the shaft 98 projects into a damping cylinder 99 and is connected with a non-illustrated damping piston. In the event of an overload, the worm or screw 97 together with the shaft 98 can withdraw in direction toward the damping cylinder 99. A switch 100 provided in the damping cylinder 99 signals the withdrawal of the shaft 98. A result thereof is that the adjusting drive for the worm gear 93 is shut off and the damping piston of the damping cylinder 99 is subjected to an increased oil pressure so that the worm or screw 97 is forced back into the previous position thereof. The shaft 98 is driven through a spur gear transmission 101 by an adjusting motor 102 which controls a measuring system 103.

As can be seen from FIG. 10, the stop 94 of the worm gear 92 abuts the detent nose portion 90 of the stop disk 89. This means that a specific tool is in its operating position and is carrying out a measuring operation. The stop 95 is, on the other hand, free for a new adjustment to a degree of elevation for the next selected tool. The adjusting motor 102, controlled by the measuring system 103, rotates through the intermediary of the spur gear transmission 101, the shaft 98, the worm or screw 97, the worm gear 93 and therewith also the stop 95 through a predetermined angle. If the measuring operation according to instant adjustment of the storage drum 1, as shown in FIG. 10, is ended and the tool which has been placed in operation has returned to the neutral or rest position thereof, the hydraulic storage drum drive with the cylinder 5 are set in motion and the rack 80 is axially displaced. The linear path which the rack 80 accordingly travels is transformed by the pinion 81 into rotary motion and is transferred through the shaft 82 as well as the spur gear drive 84, 86 to the shaft 85 of the storage drum. Accordingly, the detent nose portion 91 is displaced toward the newsly adjusted stop 95 at a relatively high speed. The rotary motion of the shaft 85 is controlled, however, as mentioned hereinabove, by the measuring system 83. Before the impact of the detent nose portion 91 upon the stop 95, the measuring system 83 effects a timely delay of the rotary motion. The insignificant force of the impact then still being produced, as described hereinbefore with respect to FIG. 11, is absorbed by the damping cylinder 99. If the stop disk 89 and the storage drum 1 therewith is newly adjusted in this manner, the adjustment of the freed stop 94 to the elevation of the next-following tool can be immediately instituted. The greatest adjustment time required at a measuring center according to the invention is mostly for the adjustment rotary motion of the storage drums and, in fact, especially when, due to the unfavorable position of the next tool with respect to the tool preceding the same, the storage drum must virtually be turned through an entire rotation. A shortening of the therefor required adjustment path of the stop 94, 95 through a rotary machine is possible due to the fact that several, for example four, indexing positions respectively offset 90° from one another are provided for the storage drum. The adjustment path of the stop 94, 95 is thereby reduced, for example, to one quarter of the length of the path otherwise required.

Frequently, when producing a bore in a workpiece, it is necessary to use several tools in succession at the same setting of the machining center. If two tools that are to be used successively are then located one after the other in the same circle of spindle sleeves in a storage drum, after the first tool has been placed in operation and completed the operation, the second tool can be brought into operating position by turning the storage drum through an angular distance corresponding to the spacing between two stored tools, without having to leave the stop 94, 95, which had been driven up for the first workpiece. For such an additional travel of the storage drum for an always constant distance, a separate adjustment cylinder can be provided. Especially when using a machining center according to the invention in a chain with other machining units, this additional adjustability is of great advantage.

Also the travel movements of the cross-feed table 10 of a machining center according to FIGS. 1 to 3, can be limited by adjustable stops, in a manner similar to that employed with the storage drums 1 and 2. Thus, FIG. 12 for example shows a drive and stop adjusting system of a machining center with a storage drum for the longitudinal displacement thereof. As described hereinbefore with respect to FIG. 2, the cross-feed table 10 is laterally displaceable on the tracks 12. A hydraulic drive mechanism similar to the mechanism 13 of FIG. 2 but not shown in FIG. 12 effects the displacement of the cross-feed table 10 on the tracks 12 of FIG. 12 through a rod 105 secured at the underside of the cross-feed table 10. In the machine base 14, adjustable stops 106 and 107 are provided for limiting the longitudinal displacement of the cross-feed table 10, i.e., the stop 106 limits the displacement toward the right-hand side of FIG. 12 and the stop 107 toward the left-hand side thereof.

In FIG. 13 there is shown in detail the adjustment device for the stop 107. The stop 107 is located at the end of a ball roll spindle 108. The other end of the ball roll spindle 108 extends through a nut 109 which is rotatably mounted in a damping piston 110. The damping piston 110 is displaceable, within a cylinder 111 secured at the machine base 14, in opposition to a given hydraulic pressure in axial direction of the ball roll spindle 108. A gear drive 112 connects the nut 109 form-lockingly with an adjusting motor 113 shown in FIG. 12 that is controlled by a measuring system 114.

The end of the ball roll spindle 108 provided with the stop 107 projects through a bearing block 115 fixedly disposed at the cross-feed table 10. The end face 116 of the bearing block 115 comes into engagement with the stop 107. A pin 117 extends in front of the end face 116 and is forced inwardly into the bearing block 115, i.e., toward the right-hand side of FIG. 13, by the stop 107 just before the end face 116 engages the latter, and, through a spring-loaded deflecting pin 118, actuates a switch 119 which renders inoperative the hydraulic drive 13 for the cross-feed table 10.

Assuming that the stop 107 would be free of the bearing block 115 and could therefore be adjusted, the measuring system 114 would then cause the adjusting motor 113, through the gear dirve 12, to rotate the nut 109 until the stop 107, due to the axial displacement of the ball roll spindle 108, has assumed the prescribed position. When the operation being carried on during the adjustment is ended and the then used tool is withdrawn, the hydraulic drive 13 slides the cross-feed table 10 by means of the rod 105 in direction of the arrow 120. Accordingly, first the pin 117 engages the stop 107 and causes, through the deflecting or diverting pin 118 and the switch 119, the shut-off of the hydraulic drive 13. However, the end face 116 of the bearing block 115 strikes the stop 107 and forces it together with the ball roll spindle and the damping piston 110, which is subjected to relative weak hydraulic pressure, in direction of the arrow 120. Through this damping displacement, the damping piston 110 is, however, immediately subjected to greater hydraulic pressure so that the stop 107 and accordingly the cross-feed table 10 are withdrawn into the previously adjusted position.

The course of displacement of the aforedescribed machining center of the invention in carrying out several operations is as follows:

A set of stops or cams for the three directions of displacement of the machining center are adjusted by the numerical control, namely a stop for the longitudinal displacement of the cross-feed table (x-axis) and the turning or rotary movement of the storage drum (y-axis) as well as a cam for shutting off the high-speed and feed displacement of the spindle stock 3, 4 in axial direction of the tools (z-axis), which is effected by an electric drive.

These adjustments are carried out while the machining center, adjusted to the other set of stops and cams, effects the preceding operation. When this operation is completed, the spindle sleeves 40, 41, 60 or 70 of the tool that has been placed in operation is withdrawn at high speed. With the signal "Spindle Sleeves at the rear," the machine is simultaneously driven in all three displacement directions of the previously adjusted stops and cams at high speed. The preselected rotary speed and rotational direction of the spindle, the drive travel distance as well as the particular spindle sleeve 40, 41, 60 or 70 in which the next tool is located are issued by the numerical control. Then the spindle sleeve of the selected tool is displaced forwardly at high speed and the feed displacement for the machining operation is introduced into the spindle stock. When the stops or cams are reached, the adjustment of the then freed set of stops and cams is introduced by the numerical control.

In a milling operation, the feed displacement is not effected in the direction of the z-axis, but rather either in the x-axis or as a turning or angular movement of the storage drum in the y-axis. Thereby, the stops 94 and 95 provided on the shaft 85 of the storage drum can form the corresponding limitation. The storage drum then swings back and forth between the two adjusted stops 94 and 95. When the stop 94 or 95 is engaged at the beginning of the milling or at the end of the milling stretch actuates the switch 100 mounted in the damping cylinder 99, which gives the signal to reverse the movement of the storage drum drive.

In addition to the aforedescribed operation of the machining center through numerically adjustable stops or cams, it is of course also possible to furnish the machine with a purely cam control or also with suitable adjusting drives with a numerical travel path control.

It is claimed:

1. Machining center comprising a cross-feed table, at least one storage drum mounted on said cross-feed table, said storage drum being rotatable about a horizontal axis and displaceable in direction of said axis, a plurality of spindle sleeves mounted in said storage drum at mutually spaced locations along at least one circle symmetrical to the periphery of said storage drum and parallel to said axis, and at least one machining tool received in each of said spindle sleeves, means controlling rotation of said storage drum about said horizontal axis to position each of said machine tools at any predetermined elevation of said one circle so as to be in operating position for machining a workpiece, and tool drive means for rotating at least one of said tools at said any predetermined elevation, said storage drum being thereby rotatable about said horizontal axis to positions at which said tools are respectively at a given elevation so as to be in operating position for machining a workpiece.

2. Machining center according to claim 1 including means for axially displacing a respective tool, located in operating position thereof, a constant distance relative to the other tools stored in said storage drum prior to performing a machining operation with the respective tool and for returning the respective tool to the original axial position thereof after completion of the machining operation.

3. Machining center according to claim 2 including means for coupling the spindle of the respective tool to said tool drive means after the respective tool has been axially displaced said constant distance.

4. Machining center according to claim 1 wherein at least one of said tools is non-rotatable for performing a turning operation on a rotatable workpiece.

5. Machining center according to claim 1 wherein said cross-feed table is movable for displacing said storage drum in direction of said horizontal axis thereof, and including stop means for limiting the movement of said cross-feed table and the turning movement of said storage drum, and control means for adjusting said stop means.

6. Machining center according to claim 5 including two sets of stops coordinated with each direction of displacement of said cross-feed table and each direction of turning of said storage drum, only one of each said sets of stops being actuable for adjusting the respective workpiece into said operating position thereof, while the other of each of said sets is kept free for adjustment through said control means to values coordinated with a next succeeding workpiece that is to be placed in operating position.

7. Machining center according to claim 5 including shock absorbing means cooperating with said stop means for cushioning shock forces imposed thereon.

8. Machining center according to claim 5 wherein parts of said cross-feed table and said storage drum, respectively, are engageable with said stop means, and including shock absorbing means cooperating with said parts for cushioning shock forces imposed thereon by engagement with said stop means.

9. Machining center according to claim 1, including a piston respectively coordinated with each of said spindle sleeves, each of the pistons being slideably received in a cylinder and subjictible to hydraulic pressure on alternating sides thereof so as to alternately drive the respective spindle sleeve and the tool received therein into operating position of the respective tool or back into a withdrawn position.

10. Machining center according to claim 1 including at least one support sleeve secured to said storage drum and coaxially surrounding one of said spindle sleeves, a cover for said one support sleeve also surrounding said one spindle sleeve and formed with a radially inner conical surface, said one spindle sleeve being formed with a radially outer conical surface force-lockingly engageable with said inner conical surface of said one support sleeve for transmitting pressure from the respective tool, that is received in said workpiece, through said one spindle sleeve to said one support sleeve.

11. Machining center according to claim 1 wherein at least one tool received in one of said spindle sleeves is non-rotatable for machining a rotatable workpiece, and including a splined shaft secured to a rear wall of said storage drum, and a guide bushing secured to an end of said one spindle sleeve and slideably mounted on said splined shaft.

12. Machining center according to claim 1 wherein said controlling means include a shaft for said storage drum, a stop disc formed with two detent nose members secured to said shaft, a worm gear loosely rotatably mounted on said shaft at opposite sides of said stop disc, drive means connected to said worm gears for adjusting the angular position thereof, each of said worm gears having a stop projecting into the rotary path of the respective detent nose members.

13. Machining center according to claim 1 comprising a machine base in which said cross-feed table is longitudinally displaceably, stop means comprising two stops for limiting the longitudinal displacement of said cross-feed table, adjustment drive means coordinated with said stops for adjusting the same, a pair of bearing blocks secured to said cross-feed table, and hydraulic drive means for driving said bearing blocks alternately into engagement with one of said stops respectively, whereby said storage drum is displaced in said longitudinal direction of said cross-feed table.

14. Machining center comprising a cross-feed table, at least one storage drum mounted on said cross-feed table, said storage drum being rotatable about a horizontal axis and displaceable in the direction of said axis, a plurality of spindle sleeves mounted in said storage drum at mutually spaced locations along at least one circle summetrical to the periphery of said storage drum and parallel to said axis, at least one machining tool received in each of said spindle sleeves, at least one support sleeve secured to said storage drum and coaxially surrounding one of said spindle sleeves and a cover for said one support sleeve also surrounding said one spindle sleeve and formed with a radially inner conical surface, said one spindle sleeve being formed with a radially outer conical surface forcelockingly engageable with said inner conical surface of said one support sleeve for transmitting pressure from the respective tool, that is received in said workpiece, through said one spindle sleeve to said one support sleeve, said storage drum being turnable about said horizontal axis to positions at which said tools are respectively at a given elevation so as to be in operating position for machining a workpiece.

15. Machining center comprising a cross-feed table, at least one storage drum mounted on said cross-feed table, said storage drum being rotatable about a horizontal axis and displaceable in direction of said axis, a plurality of spindle sleeves mounted in said storage drum at mutually spaced locations along at least one circle symmetrical to the periphery of said storage drum and parallel to said axis, at least one machining tool received in each of said spindle sleeves, at least one tool received in one of said spindle sleeves being non-rotatable for machining a rotatable workpiece, and including a splined shaft secured to a rear wall of said storage drum, and a guide bushing secured to an end of said one spindle sleeve and slideable mounted on said splined shaft, said storage drum being turnable about said horizontal axis to positions at which said tools are respectively at a given elevation so as to be in operating position for machining a workpiece.

* * * * *